United States Patent [19]
Reid, Jr. et al.

[11] 3,815,489
[45] June 11, 1974

[54] RADIANT COOKING APPARATUS

[75] Inventors: Edward A. Reid, Jr.; Stephen P. Cremean, both of Columbus, Ohio

[73] Assignee: Davmor Industries, Inc., Miami, Fla.

[22] Filed: Jan. 8, 1973

[21] Appl. No.: 322,020

[52] U.S. Cl.................. 99/339, 99/386, 99/391, 99/443 C, 126/41 C
[51] Int. Cl............................................ A47j 37/06
[58] Field of Search............. 126/41 C; 99/339, 386, 99/389, 391, 443 C

[56] References Cited
UNITED STATES PATENTS

| | | | |
|---|---|---|---|
| 1,991,906 | 2/1935 | McEvoy | 99/339 |
| 2,360,257 | 10/1944 | Muller et al. | 99/443 |
| 2,565,174 | 8/1951 | Fredenhagen et al. | 99/386 |
| 2,728,286 | 12/1955 | Ehrenberg | 99/339 X |
| 2,917,990 | 12/1959 | Ehrenberg | 99/339 X |
| 2,920,177 | 1/1960 | Brane | 99/386 |
| 3,456,578 | 7/1969 | Pinsly | 99/339 |
| 3,491,679 | 1/1970 | Kelly | 99/443 |
| 3,580,164 | 5/1971 | Baker | 99/339 |
| 3,604,336 | 9/1971 | Straub | 99/443 |

*Primary Examiner*—Billy J. Wilhite
*Attorney, Agent, or Firm*—Arnold, White & Durkee

[57] ABSTRACT

A elongate broiler is provided for simultaneously cooking meat patties and toasting buns, the broiler including coextensive passageways defined by insulated wall portions, conveyors located in each passageway, and burners of radiant tile form located in only one of the passageways. Burners are located on lower side walls, and upper wall, of one of the passageways.

9 Claims, 2 Drawing Figures

PATENTED JUN 11 1974  3,815,489

RADIANT COOKING APPARATUS

BACKGROUND OF THE INVENTION

This invention relates to apparatus for cooking portions of meat such as hamburger patties, and further relates to such apparatus in combination with apparatus for toasting portions of bread such as hamburger buns.

One of the most important considerations in the restaurant business today is the speed at which foods can be prepared. The success of the so-called fast-food industry, and especially many members of that industry, is due in large part to the quick service which may be afforded the customer after he places his order. While quick service was never a particular problem where foods have been sold at ambient temperature or below, it has been a persistent problem for those selling the more popular hot food items such as hamburgers and other hot sandwiches.

One attempt at solving these problems of the prior art is represented by apparatus in use by Davmor Industries, Inc. of Miami, Fla., wherein hamburger patties are disposed on a conveyor system moving through an oven, with cooked patties emerging from the oven only a short time after entrance. While this system has proved commercially successful and in many ways a great improvement over the then-existing state of the art, the need for improvement and new concepts has continued.

This need has manifested itself because of nagging problems with even the most sophisticated and advanced such equipment now available to the industry.

One problem with present equipment is the nonuniformity of meat patties emerging from the apparatus. Using, for example, the Davmor apparatus discussed above, periods may be experienced in which throughput of large quantities of hamburger patties will result in the emergence from the apparatus of progressively rarer patties. Since these rare patties are not acceptable to many customers, the temperature of the oven must be increased to compensate for the large throughput to provide acceptable patties. Although this method is generally satisfactory to overcome any serious objection, at least two disadvantages remain: (1) the quality of the cooked meat, being dependent on adjustment by the operator, is not uniform, and (2) valuable time and attention of personnel must be directed to maintaining the controls. Further, the chance of human error in adjusting the controls remains, perhaps resulting in some emerging patties which must be discarded because they are either too rare or too well done.

Another problem existing with the best of prior art apparatus is the comparatively large energy requirement, and consequent economic waste, required for operation. Systems such as represented by the Davmor apparatus discussed above are perhaps the best available by present standards, but Applicants have found that significant savings in energy are possible by using the apparatus of the present invention.

A further problem exists with respect to cleaning apparatus of this nautre. Because of the nature of the cooking which takes place in such ovens, they become fouled very quickly, and must be cleaned often. Such cleaning is both difficult and wasteful of employees' time.

Still further problems with the prior art have to do with meeting established combustion standards, and others.

It would be desirable if apparatus could be provided which would allow uniform cooking of meat therein, regardless of the throughput, and eliminate the need for control adjustments by an operator during periods of high throughput.

It would further be desirable if apparatus could be provided which would require for operation considerably less energy than that required by presently existing units, and hence be more economical and efficient to operate.

It would further be desirable if apparatus could be provided which would be self-cleaning.

It would further be desirable if an apparatus could be provided which would operate fully within established or standard combustion requirements.

It would be desirable if an apparatus could be provided which would provide the above-mentioned advantages in combination, in a single efficient and practical unit which could be utilized effectively in neighborhood restaurant locations.

It would further be desirable if apparatus of the type described above could be provided in the context of a broiler suitable for cooking hamburger patties and toasting hamburger buns.

Apparatus having the advantageous features mentioned in the preceding paragraphs, together with other advantages which will be apparent from the discussion which follows, is provided by this invention.

SUMMARY OF THE INVENTION

Apparatus especially useful for cooking meat such as hamburger patties on a quantity basis is provided by the invention, which includes a longitudinal tunnel oven comprised of two passageways. The first of these passageways constitutes an oven for the cooking of meat such as hamburger patties, and the other parallel passageway provides a convenient means for toasting bread such as hamburger buns. The two ovens are connected with a longitudinal opening along their entire length. Conveyors are disposed in each of the ovens for transporting meat and bread therethrough.

Burners such as ceramic burners having ports therein are included in the oven for cooking meat. Heat from the first oven passes through the longitudinal opening and toasts the bread in the second oven, without the necessity for the inclusion of burners in the second oven.

Burners are included in the upper wall and in the lower side walls of the first oven, but not directly beneath the meat-carrying conveyor.

The burners are constructed of ceramic material, and include tapered ports therein, combustion occuring in the tapered portions of the ports.

The apparatus provides for much increased throughput of cooked items with the same energy input. Also, the apparatus provides for increased efficiency and greater uniformity of product.

BRIEF DESCRIPTION OF THE DRAWINGS

In order that the invention may be more readily understood, it will be described in terms of particularly preferred embodiments which are shown in the accompanying drawings, which form a part of this specification, and wherein.

DESCRIPTION OF ILLUSTRATED EMBODIMENTS

Figure 1:
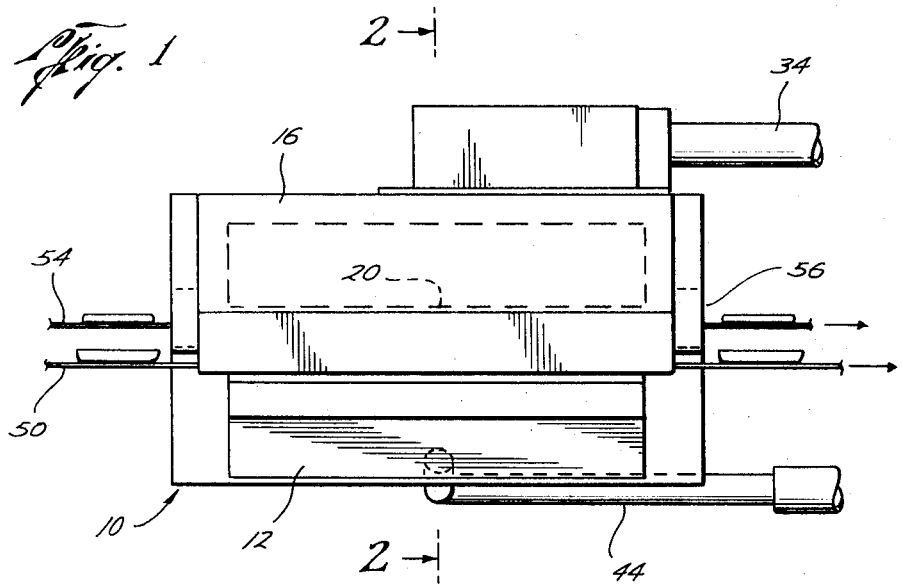
FIG. 1 is a side view of apparatus constructed in accordance with the invention; and, FIG. 2 is a view taken along the line 2—2 of FIG. 1.
Figure 2:
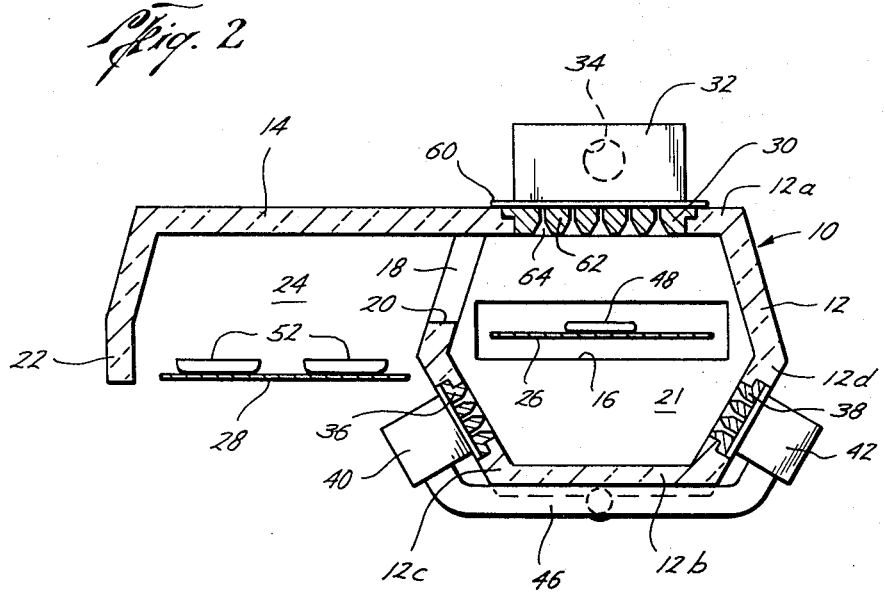

Referring now more in greater detail to FIGS. 1 and 2, which represent the best mode of the invention known to applicants at the time of this application, there is illustrated apparatus formed in accordance with the invention comprising an insulated tunnel 10 of stainless steel or other suitable metal. The tunnel 10 is comprised of a main body portion 12 and a laterally extended portion 14. The body portion 12 may be of generally tubular shape with an arcuate section removed, or as in this embodiment of generally hexagonal cross-section defining an oven cavity or passageway 16 therethrough, the top portion 12a and bottom portion 12b presenting flat sections. Lower side sections 12c and 12d meet the bottom portion 12b at an obtuse angle. A portion of one leg of the hexagon is removed to provide an opening 18, the body portion thus terminating at a plane 20.

Insulated end caps 21 are included at each inlet and outlet ends of the apparatus, to restrict the inlet and outlet openings of passageway 16 to prevent heat loss.

In the direction of the opening 18 is the laterally extended portion 14 of the tunnel 10, this extension having a downwardly projecting flange 22, forming a second passageway 24 parallel to the passageway 16. The passageway 24 is open in the lower portion thereof, thereby promoting flow of the products of combustion therethrough, and is connected to the passageway 16 along substantially the entire length thereof through the opening 18.

Into the passageway 16, and extending completely therethrough, is positioned a meat conveyor 26 upon which meat patties may be disposed for cooking. Into the passageway 24, and extending completely therethrough, is positioned another conveyor 28 upon which buns may conveniently be disposed for toasting. The conveyors 26 and 28 are driven by any suitable drive means well-known in the art.

Flush with the upper wall 12a of the tunnel 10 is a heat energy source such as a burner 30 of the radiant tile type, mounted on a plenum 32. The burner may be conveniently fed by a fuel mixture of natural gas and air, or other suitable fuel, from a line 34. Mounted in the lower side walls 12c and 12d, respectively, are radiant tile burners 36 and 38. The burners 36 and 38 are mounted on plenums 40 and 42, respectively. Each of these burners is operably connected in fluid communication through line 44 with a fuel source such as a combustible mixture of natural gas and air. Line 44 from the fuel source communicates with the burners 36 and 38 through the line 46 which is disposed perpendicular to the line 44.

All walls of the tunnel 10, in both the body portion 12 and the laterally extended portion 14, are desirably well insulated with any suitable commercial insulation such as Kaowool insulation, a product of Babcock & Wilcox. Alternatively, any other suitable insulating material such as that known as Fiberfrax, a product of Carborundum Company, may be used. These materials have service temperatures on the order of 2,200–2,300°F.

The radiant tile burners preferred by Applicants are those of the general type described in the U.S. Pat. to Edward A. Reid, Jr., No. 3,635,644, issued Jan. 18, 1972. These are ceramic burners, and any suitable ceramic formulation may be used, including formulations available from Hamilton Porcelains, Ltd. of Bradford, Ontario, Canada.

The burners 30, 36, 38 are desirably constructed with ports or openings 60 in the ceramic material. Each such port 60 includes a cylindrical inlet portion 62 on the side thereof opposite the passageway 16, and a tapered cone-shaped outlet portion 64 adjacent the passageway 16, the portion 64 tapering to maximum diameter at the point of entrance to passageway 16. The combustible mixture enters the portion 62 of the port and combustion occurs in the portion 64 thereof. This arrangement is believed to provide superior cooking efficiency and promote uniformity of cooking of the finished product.

The tunnel 10 and burners 30, 36 and 38 may be of any convenient length, and it may be desirable to provide burners 36, 38 in the side walls 12c, 12d of greater length than the burner 30 in top wall 12a. This is possible because of the fact that the burner 30 is oriented parallel to the meat patty 48 and thus may be placed slightly closer to the patty.

Provision of the burners 36, 38 in the side walls 12c, 12d rather than in bottom wall 12b prevents plugging of burner ports and localized cracking that might occur from dropping of fat from the meat patty as the meat is cooked.

The apparatus described herein can be constructed in any convenient size, but it is contemplated that the length of the passageway 16 will be on the order of about 15 to about 40 inches. With apparatus of that size, burners may be constructed having input of between about 110,000 and 220,000 BTU/Hr., with a production rate of upwards of 500 large (approximately 6-inch diameter) hamburger patties per hour, depending upon the exact size of the apparatus which is selected.

In practice, meat patties 48 are placed on the conveyor 26 at the end 50 thereof, the buns 52 are placed on the conveyor 28 at the end 54 thereof. The infrared burners are ignited and the patties and buns pass through the tunnel 10, whereupon the patties are cooked by the burners 30, 36, and 38. Combustion products in the passageway 16 pass through the opening 18 into the passageway 24, thereby toasting the buns on the conveyor 28 without the necessity of a separate burner being placed in that passageway.

As the meat patties and buns reach the end 56 of the apparatus they are removed, the buns being well toasted and the patties cooked to the desired extent, both patties and buns then being in condition to assemble into the finished hamburger.

Tests have shown that, for the same burner input as is used with the most efficient apparatus now available, such as described above, the apparatus of this invention will give a production rate which is twice as high. Further, despite the fact that twice as many patties are produced, greater uniformity of cooked product, independent of the load on the broiler, is provided. Further, this is accomplished without the disadvantageous loss of employee time required to check and adjust the temperature of the burners, etc.

Further, such tests have also revealed that the apparatus of the invention is pyrolytically self-cleaning and meets generally accepted combustion standards for commercial cooking appliances.

Thus, the invention provides apparatus which satisfies the objectives mentioned above.

Although the invention has been described in terms of particularly preferred embodiments, it will be apparent to those of skill in the art that various changes may be made in the exemplary apparatus shown and described, without departing from the scope of the invention as defined in the following claims.

We claim:

1. Pyrolytically self-cleaning apparatus for uniformly and efficiently cooking portions of meat and bread, comprising:
   a first generally tubular passageway defining a first oven, said oven having disposed therein
      a conveyor for transporting meat portions longitudinally therethrough, and
      radiant energy burners located in the top wall and lower side walls of said passageway for cooking the meat portions as they travel therethrough;
   a second generally tubular passageway defining a second oven, said second oven being disposed parallel to said first oven and said second oven having disposed therein
      a conveyor for transporting bread portions longitudinally therethrough;
   said first oven being connected with said second oven by a longitudinally extending opening along substantially the entire length thereof, so that heat from said first oven may be readily transferred to said second oven; and,
   means for connecting said burners to a source of combustible gas.

2. Apparatus in accordance with claim 1, wherein said burners are constructed of ceramic material with ports therein, said ports having portions thereof tapered to their largest diameter adjacent the walls of said first oven.

3. Apparatus in accordance with claim 2, wherein said ports have cylindrical inlet portions on the side thereof away from said first oven, and tapered portions on the side thereof adjacent said first oven.

4. Apparatus in accordance with claim 1, wherein said first oven is generally hexagonal in cross-section, the burners in said lower side walls being disposed at an angular relationship with the meat portions on said conveyor.

5. Apparatus in accordance with claim 4, wherein said longitudinal opening is disposed in an upper side wall of said first oven.

6. Pyrolytically self-cleaning apparatus for uniformly and efficiently cooking hamburger patties and hamburger buns, comprising:
   a first generally tubular passageway defining a first oven, said oven having disposed therein
      a conveyor for transporting hamburger patties longitudinally therethrough, and
      radiant energy burners constructed of a ceramic material located in walls of said oven, said burners having tapered ports therein wherein combustion of a combustible mixture occurs to uniformly cook the hamburger patties on said conveyor;
   a second generally tubular passageway defining a second oven, said second oven having disposed therein
      a conveyor for transporting hamburger buns longitudinally therethrough;
   said first oven being connected with said second oven along substantially the entire length thereof by a longitudinal opening therebetween; and,
   means for connecting said burners to a source of combustible gas.

7. Apparatus in accordance with claim 6, wherein said burners are located in a top wall and lower side walls of said first oven.

8. Apparatus in accordance with claim 6, wherein said ports have cylindrical inlet portions on the side thereof away from said first oven, and tapered portions on the side thereof adjacent said first oven.

9. Apparatus in accordance with claim 6, wherein said first oven is generally hexagonal in cross-section, the burners in said lower side walls being disposed at an angular relationship with the meat portions on said conveyor.

* * * * *